(12) United States Patent
Rose et al.

(10) Patent No.: US 7,564,779 B2
(45) Date of Patent: Jul. 21, 2009

(54) RING RAPID SPANNING TREE PROTOCOL

(75) Inventors: Laurence Rose, Oak Park, CA (US); Guillaume Ivaldi, Agoura Hills, CA (US)

(73) Assignee: Alcatel Lucent, Paris (FR)

( * ) Notice: Subject to any disclaimer, the term of this patent is extended or adjusted under 35 U.S.C. 154(b) by 728 days.

(21) Appl. No.: 11/176,874

(22) Filed: Jul. 7, 2005

(65) Prior Publication Data

US 2007/0008964 A1   Jan. 11, 2007

(51) Int. Cl.
*H04L 12/42* (2006.01)
(52) U.S. Cl. ................. 370/223; 370/256; 709/251
(58) Field of Classification Search ............. 370/256, 370/403, 404, 223; 709/251; 398/4
See application file for complete search history.

(56) References Cited

U.S. PATENT DOCUMENTS 6,766,482 B1   7/2004   Yip et al.

| | | | |
|---|---|---|---|
| 2004/0081083 A1* | 4/2004 | Sekihata | 370/222 |
| 2004/0090926 A1* | 5/2004 | Hong et al. | 370/254 |
| 2004/0160904 A1* | 8/2004 | Enomoto et al. | 370/256 |

* cited by examiner

*Primary Examiner*—Wing F Chan
*Assistant Examiner*—Matthew Campbell

(57) ABSTRACT

In a method for enabling facilitation of re-convergence, designation information for a first port of each one of a plurality of bridges in a multi-bridge ring is received and designation information for a second port of each one of a plurality of bridges in a multi-bridge ring is received. The first port of each one of a plurality of bridges is a first direction Ring Rapid Spanning Tree Protocol (RRSTP) port and the second port of each one of a plurality of bridges is a second direction RRSTP port. The first direction around the ring (e.g., a forward direction) is opposite the second direction around said ring (e.g., a backward direction). A first reserved MAC address is associated with the first direction port of each one of the bridges and a second reserved MAC address is associated with the second direction port of each one of the bridges.

19 Claims, 9 Drawing Sheets

RING RAPID SPANNING TREE PROTOCOL

FIELD OF THE DISCLOSURE

The disclosures made herein relate generally to communication network path redundancy techniques and, more particularly, to spanning tree protocols.

BACKGROUND

Various types of spanning tree protocols are known (i.e., conventional spanning tree protocols). Such conventional spanning tree protocols serve to provide path redundancy for nodes of a network, while preventing any undesirable loop in the network. Examples of conventional spanning tree protocols include, but may not be limited to, Spanning Tree Protocol (STP), Rapid Spanning Tree Protocol (RSTP) and Multiple Spanning Tree Protocol (MSTP). STP is a legacy protocol in accordance with the IEEE 802.1D 1998 standard. RSTP is in accordance with IEEE 802.1D 2004 standard. MSTP is in accordance with the IEEE 802.1Q 2003 standard.

A particular process a spanning tree protocol performs when a change in topology occurs is referred to as convergence calculation, convergence or re-convergence. Examples of such topology changes include, but may not be limited to, a link failing and a bridge or bridge port being added to the topology. Such a convergence process comprises computing a new spanning tree from a root bridge to all bridges and designating some bridge ports as "forwarding" or "discarding". Through this convergence process, a loop free topology is provided for. Once convergence is finished, the network node topology is stable and the implemented spanning tree protocol is in steady state, exchanging only hello message about every 2 seconds (i.e., referred as the "hello time").

Avoiding loop in a network is an important task of a spanning tree protocol. When loop occurs, communication of information via an affected bridge or bridges quickly becomes very confusing and demanding of processing resources (e.g., central processing unit resources). If loop occurs, a bridge may see the same station (i.e., its own MAC address) on two different ports at the same time, thus misleading the forwarding engine as to which destination port packets should be sent.

Loop in a network also adversely impacts functionality and/or efficiency of Source Learning Protocol. Source Learning Protocol refers to a software or hardware processing, whose role is maintaining a Layer 2 bridging table (i.e., the Filtering database). This Layer 2 bridging table associates any learned, given MAC address to a given port in a given VLAN. In doing so, it allows Layer 2 forwarding processing to take place (i.e., sending a given frame to the correct port). When loop occurs, each time a station is learned on a port, if that same MAC address has been seen before on another port, the Source Learning Protocol software carries out "Mac Address Movement" processing whereby it updates the Layer 2 bridging table according to the most recent information available (i.e., finding an old MAC address, deleting it and creating a new MAC address).

Conventional spanning tree protocols such as, for example, STP, RSTP and MSTP inhibit flooding or bridging of Bridge Protocol Data Units (BPDUs) by hardware. As is the case, conventional spanning tree protocols are only implemented in software because of the complexity of the associated algorithm. Spanning tree protocol software is solely responsible for sending BPDUs across a network. This means that the more nodes there is in a given topology, the longer it takes to re-converge because each time a BPDU is received, it has to be processed by spanning tree protocol software before the spanning tree protocol software can in turn send the BPDUs on one or several ports.

Hardware transit time through a non-overloaded bridge is estimated around 5 microseconds for small frame data units such as BPDUs. Software processing time to process and send one or several BPDUs can be as low as 10-50 milliseconds, in the case the software is not overloaded. But, it can increase dramatically, when software is getting congested. Thus, with conventional implementations of spanning tree protocols, it is not practical or realistic to guaranty sub-x millisecond re-convergence times for all topology because software-processing time is usually not negligible as compare to hardware transit time.

Ethernet Automatic Protection Switching (EAPS) is a proprietary protocol offered by Extreme Network. EAPS offers resilient packet ring (RPR) functionality to provide sub-second fail-over protocol that allows a ring topology to re-converge without the use of spanning tree protocol functionality (i.e., IEEE 802.1D). Extreme Network's EAPS claims to provide a sub-50 ms recovery time, regardless of the number of nodes in a ring. However, it is probable that EAPS is subjected to transit time through all the nodes in a ring, which is accomplished via hardware to minimize the recovery delay. EAPS sends a "Topology Change" kind of frame in order to flush an associated forwarding table, thus allowing new topology to get learned. Accordingly, the claimed sub-50 ms re-convergence time likely does not take into account that processing of topology change across the entire ring (including flushing the L2 forwarding table) in order to relearn the right topology. Probably, activating a link known in advance as the backup link after a failure occurs in the ring is considered as re-convergence.

EAPS ports are excluded from participating to any spanning tree protocols in a particular VLAN. Thus, EAPS is clearly not compatible with any spanning tree protocol (e.g., STP RSTP or MSTP). EAPS relies on two distinct mechanisms: link down alerts and ring polling frames. EAPS elects a master node, which has a primary port and a secondary port. When a link down event occurs, the node that detects the link down event immediately sends a link down control frame toward the master node. The master node is also responsible for activating the backup link, which is its secondary link. The secondary link on a master node is normally blocked to insure a loop-free topology. After a failure, when the secondary link is up, the master node flushes its own forwarding table and also sends a control frame to all other ring nodes, instructing them to flush their forwarding tables. Ring polling frames are also used to monitor link failure. If a ring is safe, then each ring-polling frame is sent from the primary port and received on the secondary port. When a failure occurs, after the fail-period timer times out, the master node activates its secondary port and proceeds to the topology change kind or processing, in flushing its own forwarding table and in instructing the other nodes to do so (i.e., via the control frame). It can be seen that the ring polling mechanism is also used to provide a back-up mechanism in case the link down" mechanism fails when, for example, a link down frames gets lost.

Therefore, an implementation of spanning tree protocol that overcomes drawbacks associated with conventional implementations of spanning tree protocol would be useful, advantageous and novel.

SUMMARY OF THE DISCLOSURE

Embodiments of the present invention relate to devices at layer two (L2) of the Open Systems Interconnection (OSI)

reference model, which are controlled by proprietary, standardized L2 (i.e., IEEE standardization) and layer 3 (L3) protocols (i.e., IETF standardization) protocols. These devices are hereinafter referred to as "bridges". Such embodiments of the present invention are advantageous and novel implementations of Rapid Spanning Tree Protocol (RSTP). The current RSTP standard is defined in the document "IEEE 802.1D 2004 Standard for Local and Metropolitan Area Networks: Media Access Control (MAC) Bridges".

The present invention is referred to herein as Ring rapid Spanning Tree Protocol (RRSTP). RRSTP solves a problem that exists with various conventional configurations of Spanning Tree Protocols (STPs). Examples of such STPs include, but are not limited to, basic STP (i.e., STP), Multiple STP (MSTP) and Rapid Spanning Tree Protocol (RSTP). The problem with such conventional configurations of STP is that convergence time depends on the number of nodes in a topology. As the number of nodes increases, the time for re-converge increases.

RRSTP overcomes limitations of conventional configurations of STP in facilitating re-convergence. More specifically, RRSTP provides a means of facilitating re-convergence with a bound convergence time and in a manner that maintains compatibility with RSTP. Because RRSTP supports RSTP, it has to insure that the "bridge max age" variable that also translates somehow into "hop-count" should be set between 6 and 40, as per the standard, still limiting the ring size to less than a given maximum number of nodes, according to complex formulas in the different known STP standards.

To insure a bound convergence time, RRSTP relies on hardware of a node (i.e., a bridge) to forward proprietary Bridge Protocol Data units (BPDUs). Advantageously, RRSTP allows sub 50 ms ring spanning tree re-convergence, for the RRSTP ring, but also allows a conventional Spanning Tree protocol (i.e., RSTP or MSTP) to apply anywhere else in the ring. This means that topology of the ring is not reduced solely to an RRSTP ring, but is essentially completely free around the ring. The ring sub 50 milliseconds convergence is insured in the ring only and RRSTP provides for sub 50 milliseconds convergence with until the maximum hops induced by the "bridge max age" standard variable is achieved.

It remains true that, the number of nodes a ring still impacts total transit time and re-convergence time, even though RRSTP is implemented via hardware. However, transit time across one bridge and the time it takes to send a frame over a 1 Gbs link is about 10 microseconds. Thus, even with a big topology, the hardware transit time (i.e., time to transmit over a bridge and a 1 Gbs link) is essentially negligible with respect to software processing time.

A key aspect of RRSTP protocol is that it provides for rapid convergence in a ring topology, but maintains compatibility with other Spanning Three Protocols. This allows for two ports on a bridge to be dedicated to RRSTP, while having all ports of the bridge participating to any STP standard, including the two that are participating to the RRSTP protocol. For conventional STPs (e.g., basic STP, RSTP, and MSTP), it is useful and advantageous for RRSTP ports to be still participating to any conventional standard STP for any meshed topology, as it is any other port. In this manner, an RRSTP port interacts with the whole topology exchanging conventional BPDU frames (i.e., BPDU frames in accordance with a conventional STP), and not only the ring topology.

In one embodiment of the present invention, a method comprises receiving designation information for a first port of each one of a plurality of bridges in a multi-bridge ring and receiving designation information for a second port of each one of a plurality of bridges in a multi-bridge ring. The first port of each one of a plurality of bridges is a first direction Ring Rapid Spanning Tree Protocol (RRSTP) port, the second port of each one of a plurality of bridges is a second direction RRSTP port and the first direction around the ring (e.g., a forward direction) is opposite the second direction around the ring (e.g., a backward direction). The method further comprises associating a first reserved MAC address with the first direction port of each one of the bridges and associating a second reserved MAC address with the second direction port of each one of the bridges.

In another embodiment of the present invention, a method comprises configuring two ports of each one of a plurality bridges in a multi-bridge ring for bi-directional transmission of information transmission units and configuring a forwarding table utilized by each one of the bridges such that a first one of the ports of each one of the bridges receives traffic associated with the first reserved MAC address and a second one of the ports of each one of the bridges receives traffic associated with the second reserved MAC address. The first one of the ports of each one of the bridges is a first direction port that transmits information transmission units in a first direction around the ring and the second one of the ports of each one of the bridges is a second direction port that transmits information transmission units in a first direction opposite the first direction around the ring In another embodiment of the present invention, Spanning Tree Protocol (STP) software comprises a plurality of instructions. Instructions are provided for configuring two ports of a respective bridge on which the RRSTP software resides for bi-directional transmission of information transmission units and for configuring a forwarding table utilized by the respective bridge such that the first direction RRSTP port receives traffic associated with the first reserved MAC address and the second direction RRSTP port receives traffic associated with the second reserved MAC address. A first one of the ports is a first direction RRSTP port that transmits information transmission units in a first direction around a ring of bridges, a second one of the ports is a second direction RRSTP port that transmits information transmission units in a second direction around the ring of bridges and the first direction around the ring of bridges is opposite the second direction.

These and other objects, embodiments, advantages and/or distinctions of the present invention will become readily apparent upon further review of the following specification and associated drawings.

BRIEF DESCRIPTION OF THE DRAWING FIGURES

DETAILED DESCRIPTION OF THE DRAWING FIGURES

Figure 1A:
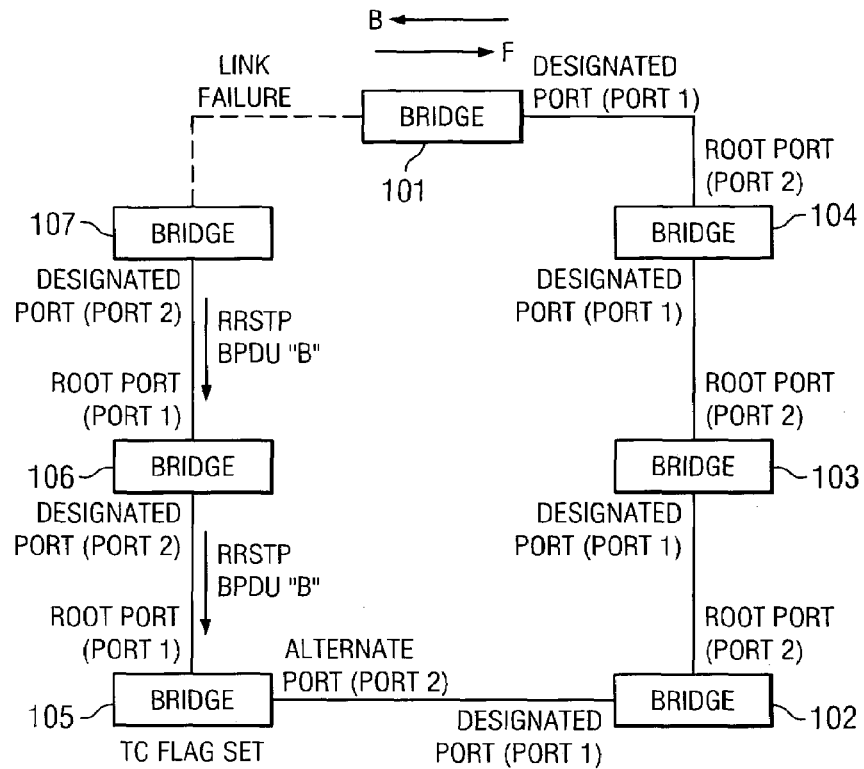
FIGS. 1A and 1B depict a method for facilitating re-convergence functionality in accordance with the present invention.

As disclosed above, the present invention (i.e., referred to herein as RRSTP) is advantageously implemented while a conventional version of spanning tree protocol (i.e., STP) is active. RRSTP is discussed hereinafter in reference to the conventional version of STP being RSTP (i.e., Rapid Spanning Tree Protocol). A skilled person will have a full understanding of RSTP topology and RSTP functionality in response to a failure (e.g., a Root port failure), thus such topology and functionality will not be discussed in elaborate and complete detail herein. However, to provide a general framework for this discussion, a brief discussion of an example of such a RSPT environment is presented herein.

One suitable example of a suitable RSTP environment in which RRSTP is capable of being facilitated is defined herein to be an environment in accordance with IEEE 802.1D 2004 standard. In this environment, all nodes (i.e., each one including a bridge) within the environment are configured with the default setting for all performance parameters such as, for example, those performance parameters defined in the IEEE 802.1D 2004 standard within Table 17-1—RSTP Timer and Transmit Hold Count parameter values. The environment may include a relatively large number of nodes (e.g., 7 nodes or more) with RRSTP providing advantageous functionality therein.

A Bridge Protocol Data Unit (i.e., BPDU) is a packet of information that conveys information between a bridge of each node within the RSTP environment. The BPDU is an example of a message priority vector that is structured as follow: <Root Id, Root Path Cost, Designated Bridge ID, Designated Port ID, Port ID>. Each time a port receives such a BPDU, its compares the vector conveyed with its own held vector, which is referred to as a port priority vector. If information received via the BDPU is a takes precedence of information of the port priority vector, this condition triggers states machines computation for facilitating computation of all ports' role (e.g., Root port, Designated port, Backup port and Alternate port), thus allowing the re-design of a spanned tree of the RSTP environment. Such a re-design comprises election of one Root Bridge in the spanned tree, a Root Port on each bridge, a Designated Port for each link or local area network, none or more Alternate Port(s) that allows an alternate path toward the root bridge and none or more Backup Port that provides an alternate path toward the leaves of the tree (i.e., subtending nodes of the tree). The Root Bridge has the lowest bridge identifier (i.e., a MAC address and a priority). The Root Port provides the shortest distance to the Root Bridge (i.e., using the root path cost standard parameter to determine such distance. Alternate Port and Backup Port roles allow connectivity in case other network components fail. Any port can also be in Forwarding, Discarding or Learning states as defined in the IEEE 802.1D 2004 standard.

Topology Change and Proposal/Agreement messages are fully explained in the 802.1D 2004 standard. With respect to a Proposal/Agreement message, a Designated port that is "Discarding" is always attempting to become a Forwarding port. As described in paragraph 17.10—Changing Port States of the 802.1D 2004 standard, "Any Designated Port that transitions to Discarding requests permission to transition to Forwarding in turn from its neighboring Bridge. The effect is that a "cut" in the active topology is propagated away from the Root Bridge until it reaches its final position in the stable active topology or the edge of the network". Thus, the effect is a temporary cut being propagated in the active topology during the proposal/agreement BPDUs exchanged between each neighbor. Such events are being spread from the current node till reaching each edge nodes. With respect to Topology Change messages, each time a port is becoming Designated Forwarding (and was not Designated Forwarding before) or Root Forwarding (and was not Root Forwarding before), the respective Topology Change state machine treats that port as becoming active in the network topology and that bridge has to flush all MAC addresses on all ports (i.e., except on itself) and to propagate a Topology Change message on all ports except on itself. Any port on any bridge receiving a Topology Change message in turn has to flush all MAC addresses on all ports except on itself and propagate a Topology Change message on all ports except on itself.

Turning now to discussion of specific aspects of the present invention, RRSTP has a number of specific environment configuration requirements for facilitating re-convergence in a network of nodes. These specific environment configuration requirements must be in place for such re-convergence functionality in accordance with the present invention to be facilitated. Accordingly, a method for facilitating RRSTP functionality in accordance with the present invention includes performing operations for implementing these specific environment configuration requirements. In one embodiment, such operations are preferably performed by software (i.e., STP software) configured for facilitating RRSTP functionality in accordance with the present invention. Such RRSTP functionality includes facilitating operations (e.g., instructing a user to perform such operations) for implementing these specific environment configuration requirements and/or facilitating re-convergence functionality.

For each node, an operation is performed for facilitating designation of two RRSTP ports maximum per RRSTP ring. In association with facilitating designation of the two RRSTP ports, an operation is performed for associating a first one of the RRSTP ports of each node with a forward direction (e.g., a first direction) and associating a second one of the RRSTP ports of each node with a backward direction (e.g., a second direction). In one embodiment, STP software in accordance with the present invention prompts a user to enter information that designates the two RRSTP port for each node and to enter information that associates the first one of the RRSTP ports of each node with the forward direction and associates the second one of the RRSTP ports of each node with the backward direction.

Accordingly, it is disclosed herein that all ports associated with the forward direction allow looping around the ring in the forward direction and all ports associated with the backward direction allow looping around the ring in the backward direction. Thus, first direction around a ring of nodes is opposite the second direction around the node of rings.

An operation is performed for reserving two proprietary destination MAC addresses (i.e., media access control addresses) per RRSTP ring. These two destination MAC addresses are also referred to herein as RRSTP MAC addresses. A first one of the MAC addresses is associated with the forward direction and a second one of the MAC addresses is associated with the backward direction. Preferably, the two MAC addresses are well-known proprietary MAC addresses. Each RRSTP BPDU complies with IEEE 802.1D 2004 BPDU format with the exception that its destination MAC address is proprietary.

A conventional STP that a node supports (e.g., RSTP, MSTP etc) must also be supported normally on each RRSTP port. Thus, the method preferably, but not necessarily, includes an operation for facilitating verification and/or implementation of the conventional STP one ach node.

After designation of two RRSTP ports maximum per RRSTP ring is performed and after association of the RRSTP ports with their respective directions is performed, an operation is performed for configuring a Layer 2 (i.e., L2) forwarding table accessible by each one of the nodes such that each RRSTP MAC address is associated to the port for that direction. In this manner, traffic associated with the RRSTP MAC addresses corresponding to the forward direction is sent to the RRSTP port associated with the forward direction and traffic associated with the RRSTP MAC addresses corresponding to the backward direction is sent to the RRSTP port associated with the backward direction.

An operation is performed for configuring hardware of each node for sending BPDUs (i.e., BPDU frames) using either of the RRSTP MAC addresses to a CPU of such hardware. A BPDU transmitted using a RRSTP MAC address is referred to herein as a RRSTP BPDU. In one embodiment, STP software is appropriated configured for programming a bridge of each node for sending each RRSTP BPDU to the CPU of the respective bridge. In this manner, each RRSTP BPDU is sent to a CPU of respective hardware and is also forwarded by the respective hardware.

Figure 1B:
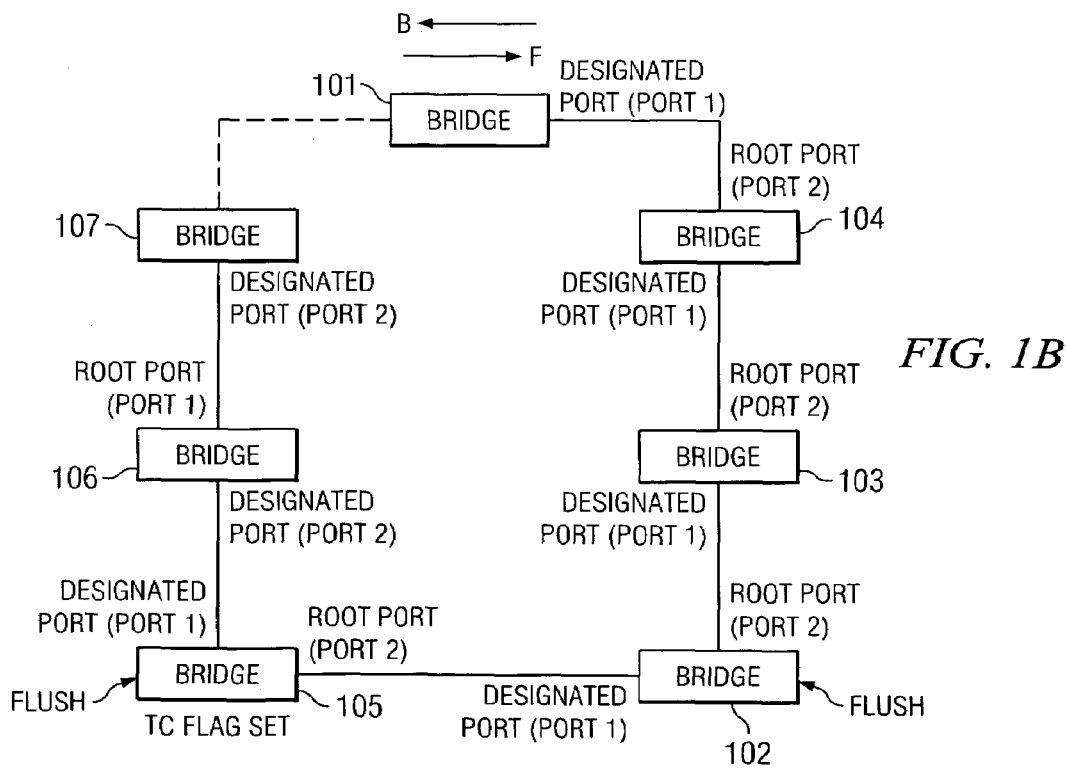

Referring to the FIGS. 1A-1B, a method for facilitating re-convergence functionality in accordance with the present invention is depicted. The re-convergence functionality is facilitated among a plurality of nodes in a ring of nodes. Each one of the nodes includes a respective bridge (i.e., Bridges 101-107). A backward direction B refers to a counterclockwise direction (i.e., from Bridge 101 directly toward Bridge 107). A forward direction F refers to a clockwise direction (i.e., from Bridge 101 directly toward Bridge 104).

Upon detecting a link failure between Bridge 101 and Bridge 107 (FIG. 1A), STP software on Bridge 107 facilitates sending of a RRSTP BPDU-B (for backward) on its port 2 using a RRSTP MAC address associated with the backward direction. The RRSTP BPDU-B includes all standard fields for a currently active conventional STP (i.e., RSTP in the present discussion). As was disclosed above in reference to environment configuration requirements for facilitating re-convergence in a network of nodes, conventional RSTP processing remains unchanged and conventional RSTP BPDU dialog is transpiring during RRSTP functionality.

Still referring to FIG. 1A, STP software on Bridge 106 receives the RRSTP BPDU-B. Because there is no port designated as Alternate on Bridge 106 and a TC flag on Bridge 106 is not set (i.e., set to active), the STP software of Bridge 106 forwards the RRSTP BPDU-B at high speed by hardware toward the RRSTP port of Bridge 105 that defines the forward direction and the CPU drops the RRSTP BPDU-B (i.e., the RRSTP BPDU-B frame).

STP software on Bridge 105 receives the RRSTP BPDU-B. Because there is an port designated as Alternate on Bridge 105 (FIG. 1A), the STP software of Bridge 105 triggers the Port Information state Machine (PIM) states RECEIVE_RRSTP, which is a RRSTP modified PIM RECEIVE state, and RRSTP modified version of rcvInfo( ) procedure. Port 1 of Bridge 105, which is currently designated as Root Forwarding (i.e., ROOT), immediately becomes designated as Designated Forwarding (i.e., Designated port (forward)) as is depicted in FIG. 1B. Port 2 of Bridge 105, which is initially currently designated as Alternate, attempts to become designated as Root Forwarding (i.e., ROOT port (forward))). Thus, REROOT state of Root port transition state machine is triggered. According to the IEEE 802.1D 2004 standard, any port that was root during the timer set by the "Recent Root timer" and that is currently designated as Designated Forwarding (i.e., Designated port (forward)) should become designated as Discarding. However, ReRoot state is not triggered on the RRSTP Designated port, in the RRSTP modified procedure setReRootTree( ). Thus, Port 1 of the Bridge 105 does not become designated as Designated Discarding. Therefore, Proposal/Agreement sequence is not triggered.

Port 2 of the Bridge 105 becomes designated as Root Forwarding. When Port 2 of Bridge 105 (i.e., the port initially designated as Alternate port) becomes designated as Root Forwarding, STP software on Bridge 105 triggers state DETECTED_RRSTP on a RRSTP port of Bridge 105 and PROPAGATING_RRSTP state of the Topology Change (TC) state machine is also triggered on that bridge port. Thus, STP software of Bridge 105 immediately sends a RRSTP_TC BPDU on Ports 1 and 2 of Bridge 105. STP software of Bridge 105 also facilitates flushing of the L2 (i.e., Layer 2) forwarding table on that RRSTP port.

In response to the RRSTP_TC BPDU being sent on Ports 1 and 2 of Bridge 105, STP software on Bridge 102 receives the RRSTP_TC BPDU. The STP software on Bridge 102 detects the RRSTP_TC BPDU (i.e., the RRSTP frame) and a set TC flag. In response, the STP software on Bridge 102 triggers NOTIFIED_TC_RRSTP state on an RRSTP port.

STP software on Bridge 102 triggers PROPAGATING_WITHOUT_SENDING state of the Topology Change state machine and facilitates flushing of the L2 forwarding table on the RRSTP port. The RRSTP_TC BPDU is also forwarded at high speed via the other RRSTP port toward Bridge 103. It is disclosed herein that all Bridges receiving the RRSTP_TC BPDU perform according to the above RRSTP functionality disclosed above for Bridge 102 (i.e., triggers PROPAGATING_WITHOUT_SENDING state of the Topology Change state machine and flushing of the L2 forwarding table on the RRSTP port).

Figure 2:
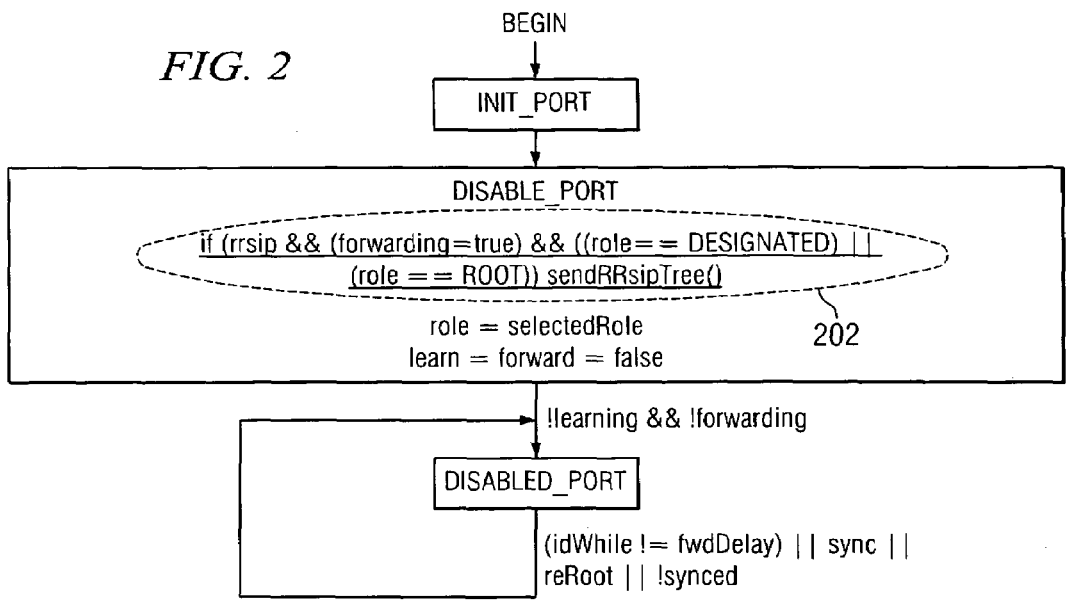
FIG. 2 depicts an embodiment of modification required to Disabled Port role transition state machine of IEEE 802.1D 2004 standard for enabling re-convergence functionality in accordance with the present invention.
Figure 4:
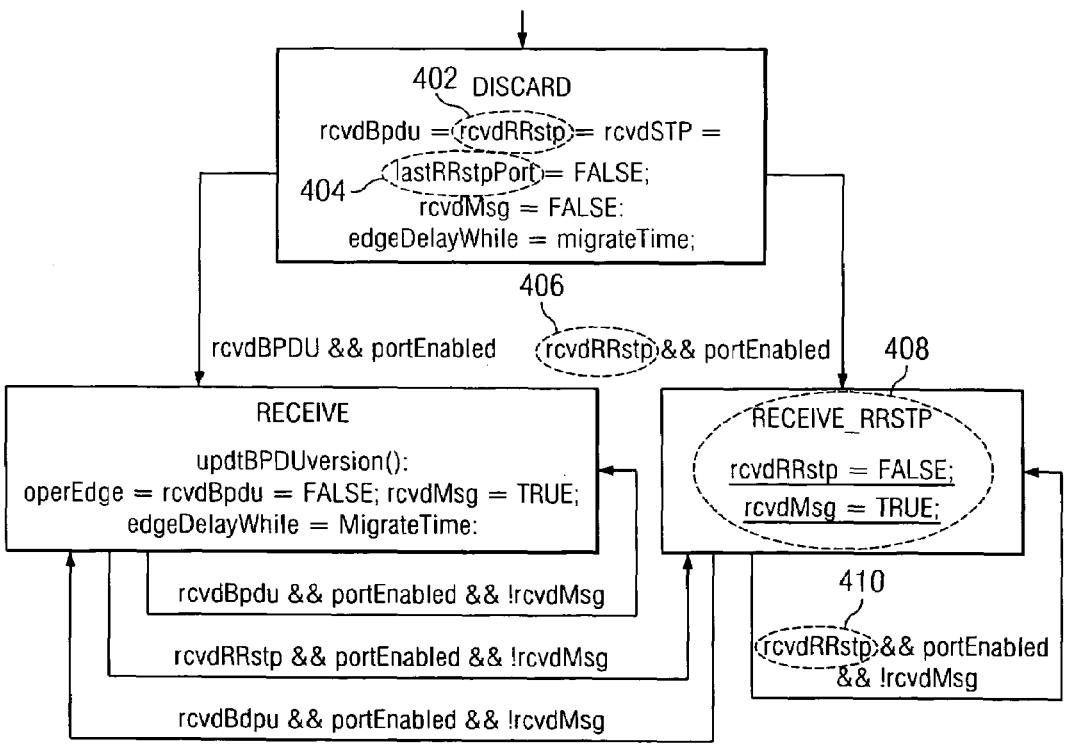
FIG. 4 depicts an embodiment of modification required to Port receive state machine of IEEE 802.1D 2004 standard for enabling re-convergence functionality in accordance with the present invention.
Figure 3:
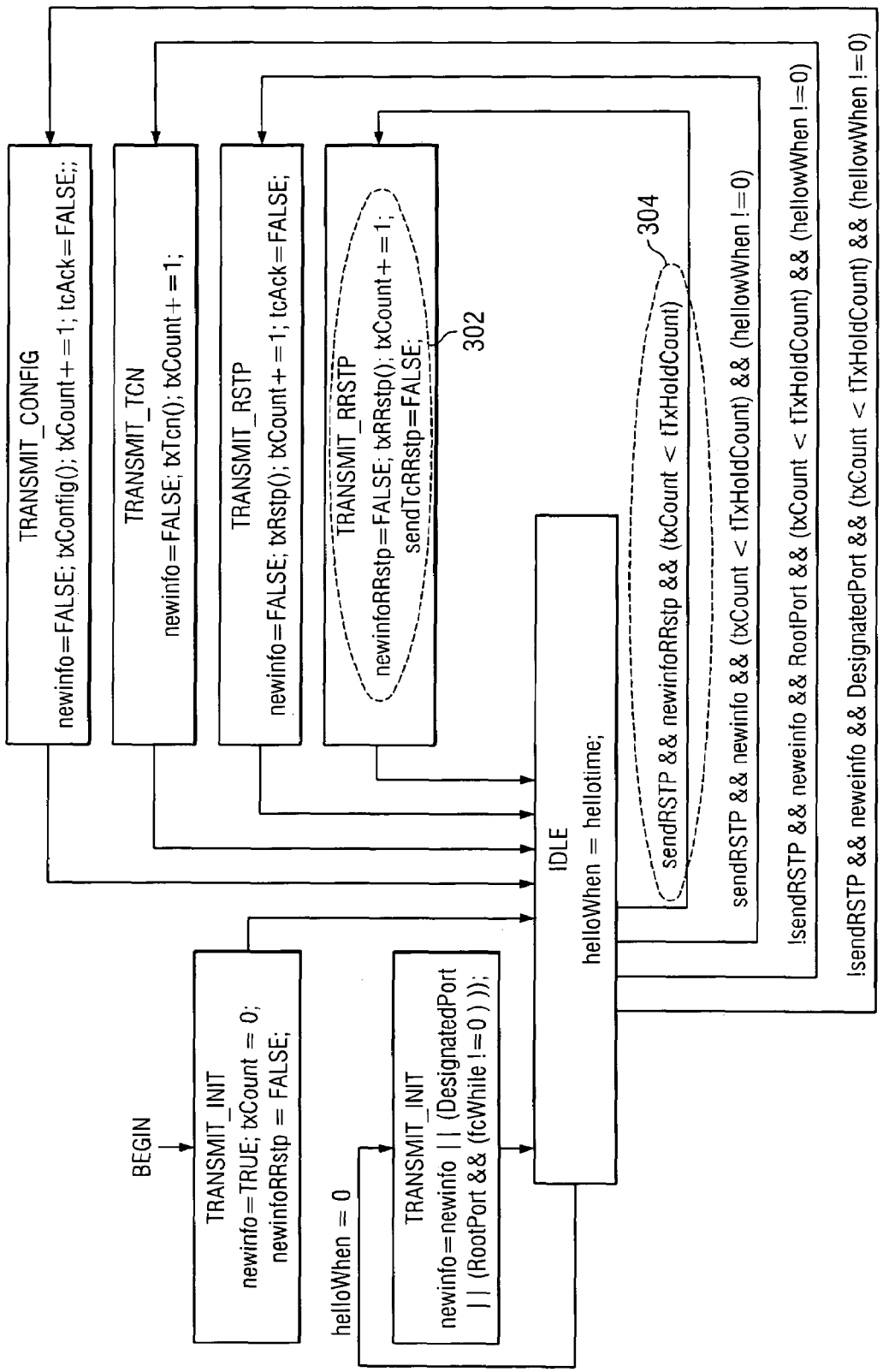
FIG. 3 depicts an embodiment of modification required to Port Transmit state machine of IEEE 802.1D 2004 standard for enabling re-convergence functionality in accordance with the present invention.
Figure 5A:
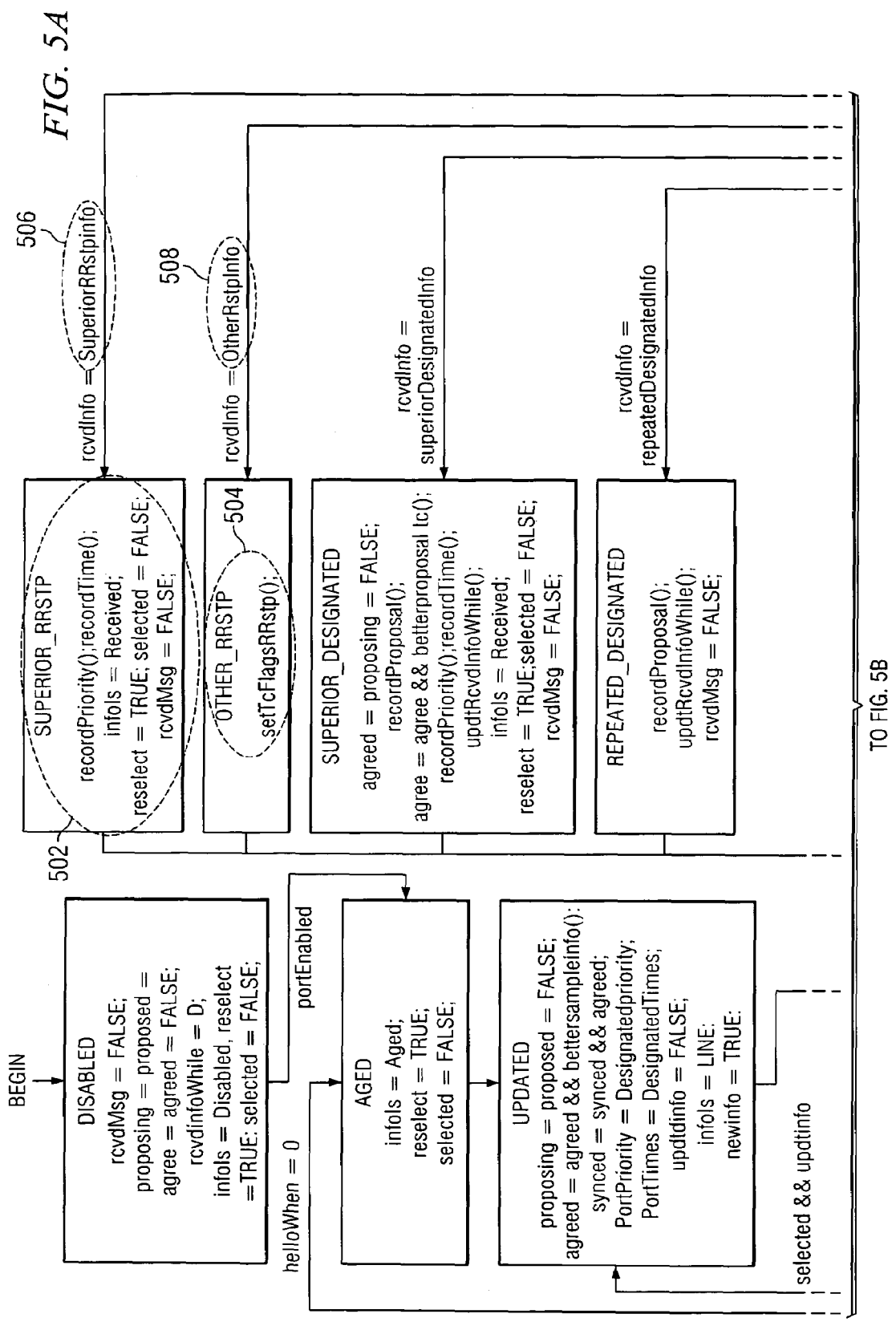
FIG. 5 depicts an embodiment of modification required to Port information state machine of IEEE 802.1D 2004 standard for enabling re-convergence functionality in accordance with the present invention.
Figure 5B:
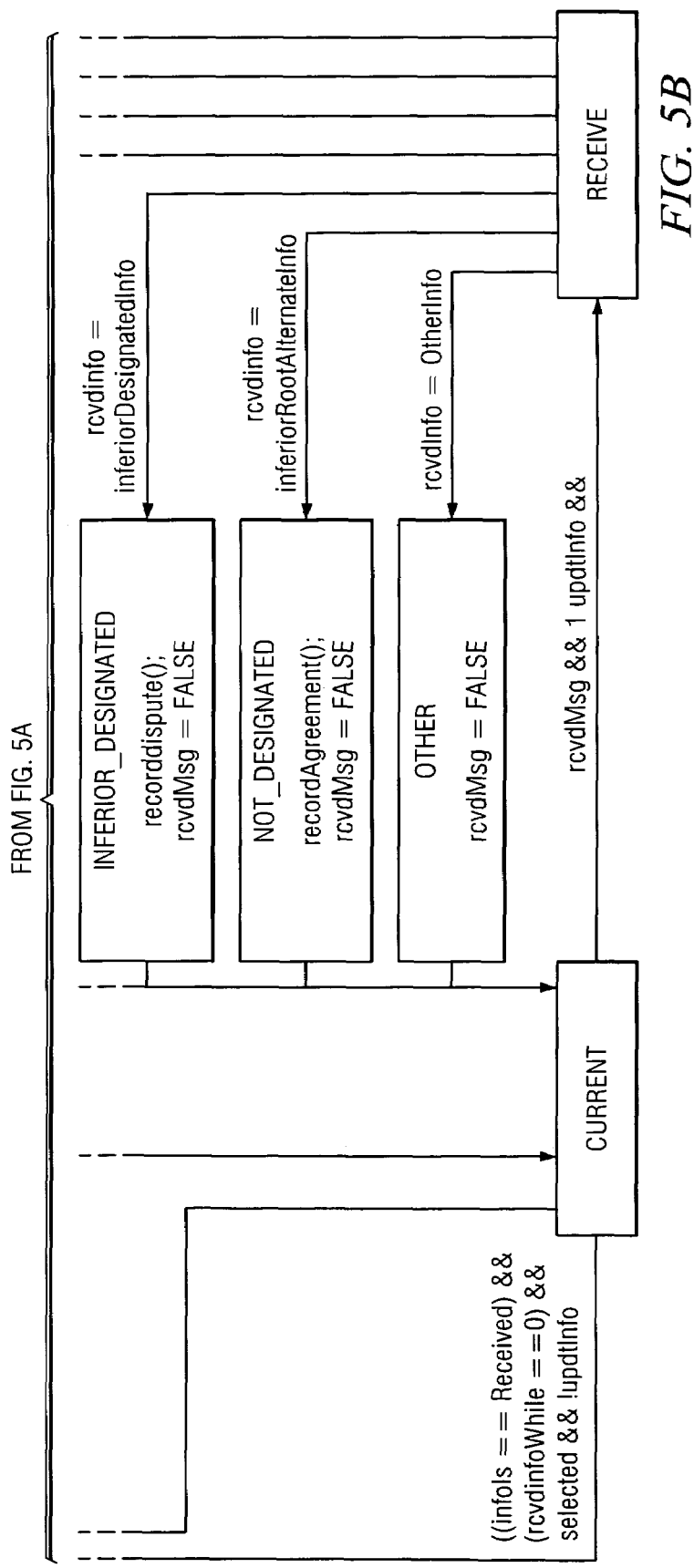
Figure 6A:
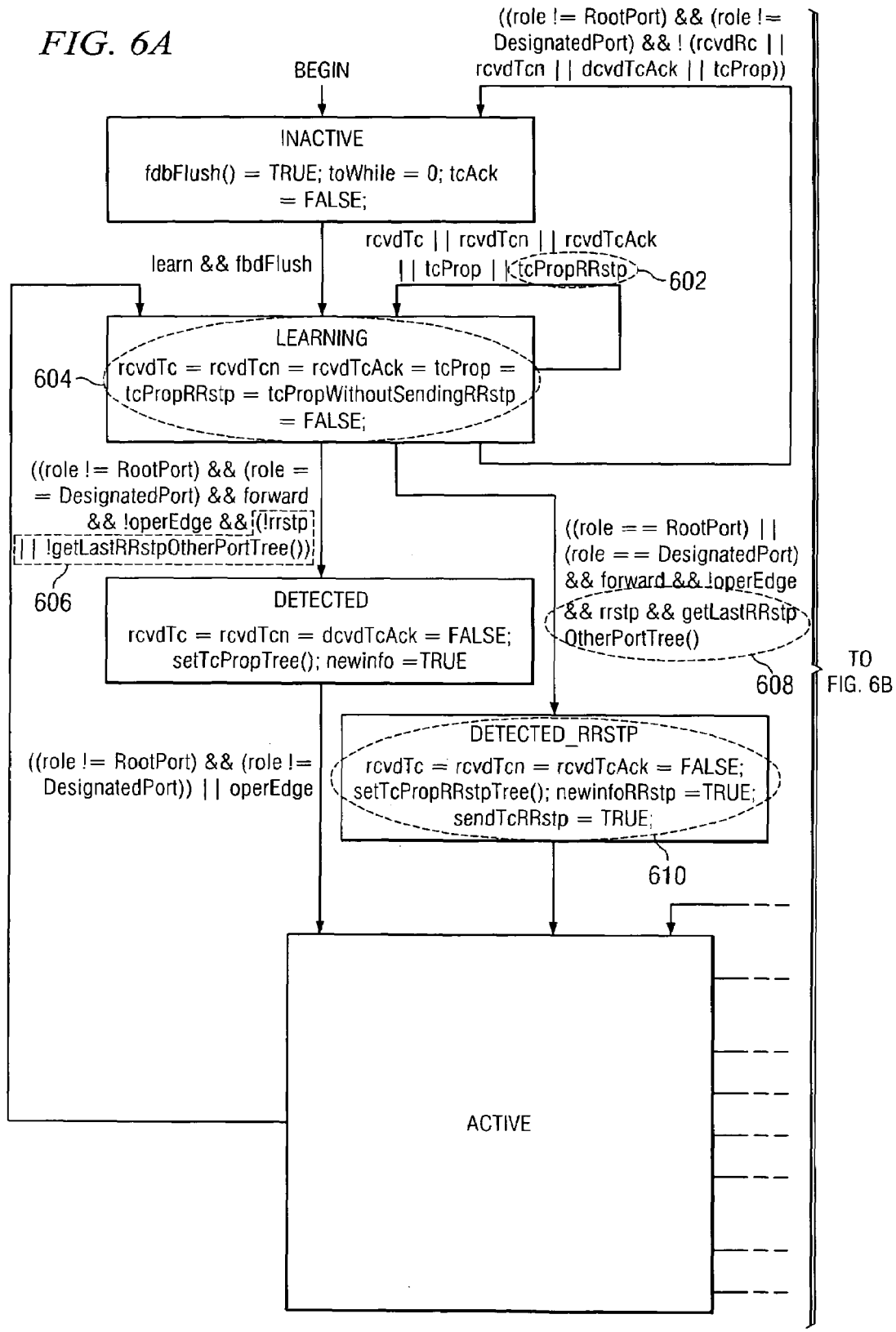
FIG. 6 depicts an embodiment of modification required to Topology Change state machine of IEEE 802.1D 2004 standard for enabling re-convergence functionality in accordance with the present invention.
Figure 6B:
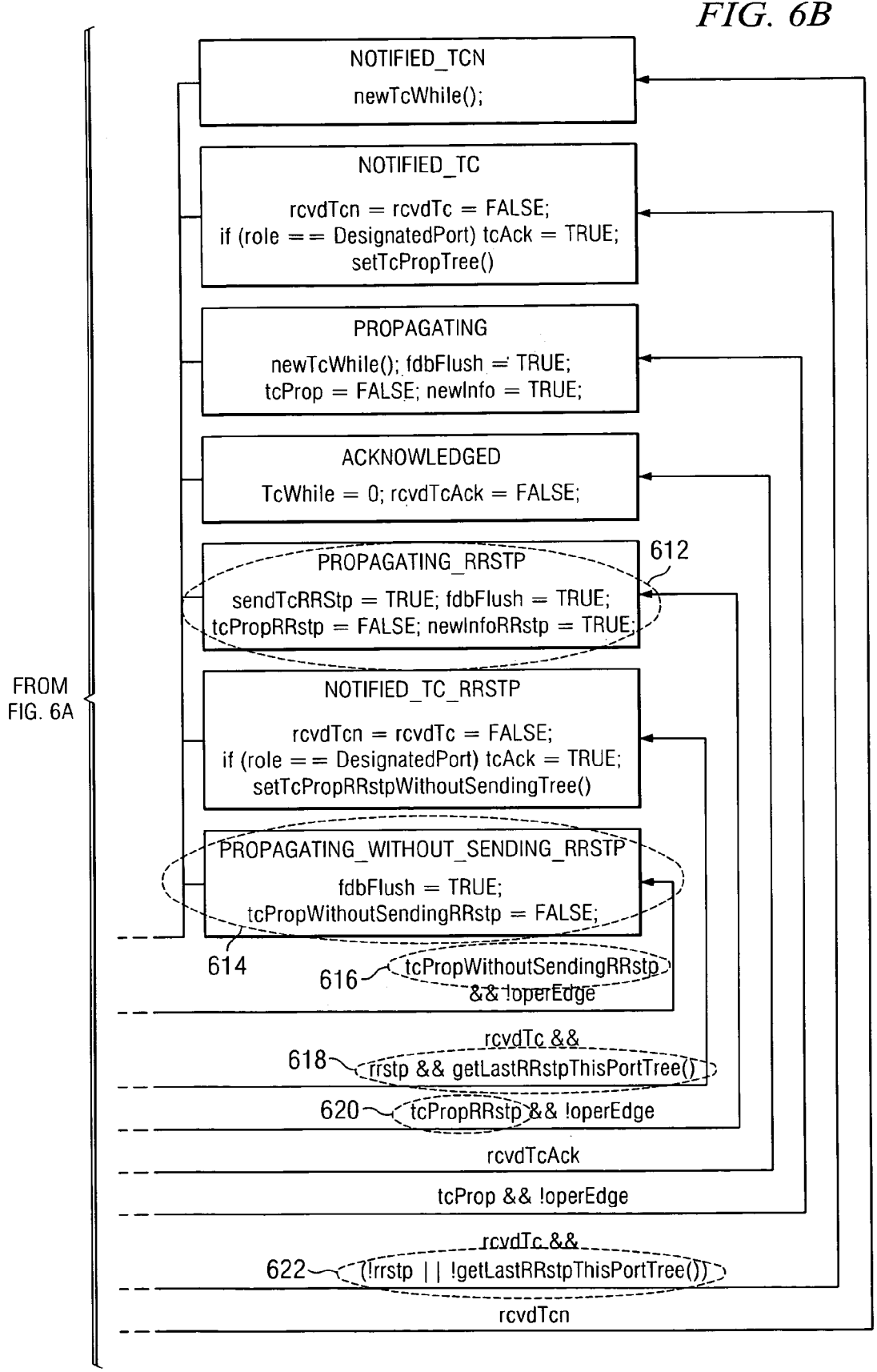

For enabling facilitation of RRSTP functionality as disclosed above in reference to FIGS. 1A and 1B, modification to various IEEE 802.1D 2004 standard state machines is required. The denoted instructions in FIG. 2 (i.e., encircled instructions 202) are such required modification to the Disabled Port role transition state machine. The denoted instructions in FIG. 3 (i.e., encircled instructions 302 and 304) are such required modification to IEEE 802.1D 2004 standard Port Transmit state machine. The denoted instructions in FIG. 4 (i.e., encircled instructions 402-410) are such required modification to IEEE 802.1D 2004 standard Port receive state machine. The denoted instructions in FIG. 5 (i.e., encircled instructions 502-508) are such required modification to IEEE 802.1D 2004 standard Port information state machine. The denoted instructions in FIG. 6 (i.e., encircled instructions 602-622) are required modification to IEEE 802.1D 2004 standard Topology Change state machine.

Table 1 below disclosed a description of procedures for various RRSTP state machines. Table 2 below discloses a description of RRSTP per-port variables.

TABLE 1

RRSTP State Machine Procedures

| | |
|---|---|
| findAlternate( ) | An implementation dependant procedure that returns true if a RRSTP Alternate port part of the same ring than the RRSTP port that receives the RRSTP BPDU that is found. It returns FALSE otherwise. |
| getLastRRstpOtherPortTree( ) | An implementation dependant procedure that returns true if a RRSTP BPDU is received on the RRSTP port part of the same RRSTP ring than the port that is calling that procedure (returns lastRRstpPort of the other RRSTP port). It returns FALSE otherwise. |
| getRecvRRstpThisPortTree( ) | An implementation dependant procedure that returns true if a RRSTP BPDU is received on the port that is calling that procedure (returns lastRRstpPort of that port). It returns FALSE otherwise. |
| rcvInfo( ) | Decodes the message priority and timer values from the received BPDU storing them in the msgPriority and msgTimes variables. Returns SuperiorRRstpInfo if: LastRRstpPort is true and findAlternateRRstpTree( ) is true. Returns OtherRRstpInfo if: LastRRstpPort is true and the RRSTP frame conveys a Topology Change flag. Returns SuperiorDesignatedInfo if: the received message conveys a Designated Port Role, and 1. the message priority is superior (17.6) to the Port's port priority vector, or 2. the message priority vector is the same as the Port's port priority vector, and any of the received timer parameter values (msgTimes-17.19.15) differ from those already held for the Port (portTimes-17.19.22). Returns RepeatedDesignatedInfo if: the received message conveys Designated Port Role, and a message priority vector and timer parameters that are the same as the Port's port priority vector or timer values. Returns InferiorDesignatedInfo if: the received message conveys a Designated Port Role, and a message priority vector that is worse than the Port's port priority vector. Returns InferiorRootAlternateInfo if: the received message conveys a Root Port, Alternate Port, or Backup Port Role and a message priority that is the same as or worse than the port priority vector. Otherwise, returns OtherInfo. |
| sendRRstpTree( ) | An implementation dependant procedure that is called only when one of the RRSTP port was active (Root or Designated forward) and becomes "DisabledPort". Sets the RRSTP variable, newInfoRRstp, to true on the other RRSTP port of the same RRSTP ring than the disabled port. |
| sendTcRRstp | A boolean. Used to send a Topology change flag in the txRRstp( ) procedure. Reset in the Port Transmit state machine state's TRANSMIT_RRSTP. |
| setRerootTree( ) | sets reRoot TRUE for all ports of the Bridge except if the port is a RRSTP port (rrstp is TRUE) with a DesignatedPort role, and if the last BPDU is a RRSTP BPDU received on the port (getRcvdThisPortRRstp( ) is TRUE). |
| setTcPropRRstpTree( ) | An implementation dependant procedure that sets tcPropRrstp on all ports if the port is not calling that procedure, if the port is a RRSTP port (rrstp is TRUE), and if the last BPDU is a RRSTP BPDU received on the port part (getRecvRRstpPortTree( ) is TRUE). The procedure sets tcProp on all ports if the port is not calling that procedure, and if the port is not a RRSTP port (rrstp is FALSE) or if the last BPDU is not a RRSTP BPDU received the port part (getRecvRRstpPortTree( ) is FALSE). |
| txRRstp( ) | Similar to the standard 802.1D 2004 txRstp procedure. However, the MAC DA must set according to the proprietary MAC DA addresses used for that RRSTP ring and direction and not according to the 802.1D 2004 standard. Moreover, the message priority vector RootBridgeId must be set to an arbitrary value, the highest possible. Beside newTcWhile( ) is not used. If sendTcrRstp is set to true, the Topology Change flag is set, and sendTcRRstp is reset. |

TABLE 2

RRSTP Per Port Variables

| | |
|---|---|
| lastRRstpPort | A boolean. Reset when any valid RRSTP BPDU is received. Set by system dependent processes on any RRSTP port receiving a valid RRSTP BPDU. This variable is used to track the last port receiving the last valid RRSTP BBPDU. |
| newInfoRRstp | A boolean. Set if a RRSTP BPDU is to be transmitted. Reset by the Port Transmit State Machine. |
| rcvdRRstp | A boolean. Set by system dependent processes (during BPDU receive), this variable notifies the Port Receive state machine when a valid RRSTP BPDU is received on the Port. Valid here has the same meaning as in the 802.1D 2004 standard and related to the standard variable "rcvdBPDU" plus the following: 1. the port must be a RRSTP port (rrstp is set), and 2. the BPDU must be an RST BPDU with the MAC DA matching the MAC DA associated with the other port in the same ring, and 3. there must be either an Alternate RRSTP port on that bridge (findAlternate( ) is TRUE), or, a Topology Change flag is received in the RRSTP BPDU. If one of those RRSTP conditions is not set, the frame is dropped by software. Reset by the Port Receive state machine. |
| Rrstp | A boolean. Set if the port is declared as part of a RRSTP ring after the user enters a CLI command. Reset if the use declares that port as non-RRSTP, after the use enters a CLI command. |
| tcPropRRstp | A boolean: Set by the Topology Change state machine to indicate that a RRSTP topology change should be propagated through this port. |
| tcPropWithoutSendingRRstp | A boolean: Set by the Topology Change state machine to indicate that a RRSTP topology change should not be propagated through this port. |

For security reason, Bridge configured in accordance with the present invention (e.g., with STP software in accordance with the present invention) drops any RRSTP frame on a non-RRSTP port, as defined by the variable rcvdRRstp. RRSTP BPDUs are also burst limited as are standard STP BPDUs.

Figure 7:
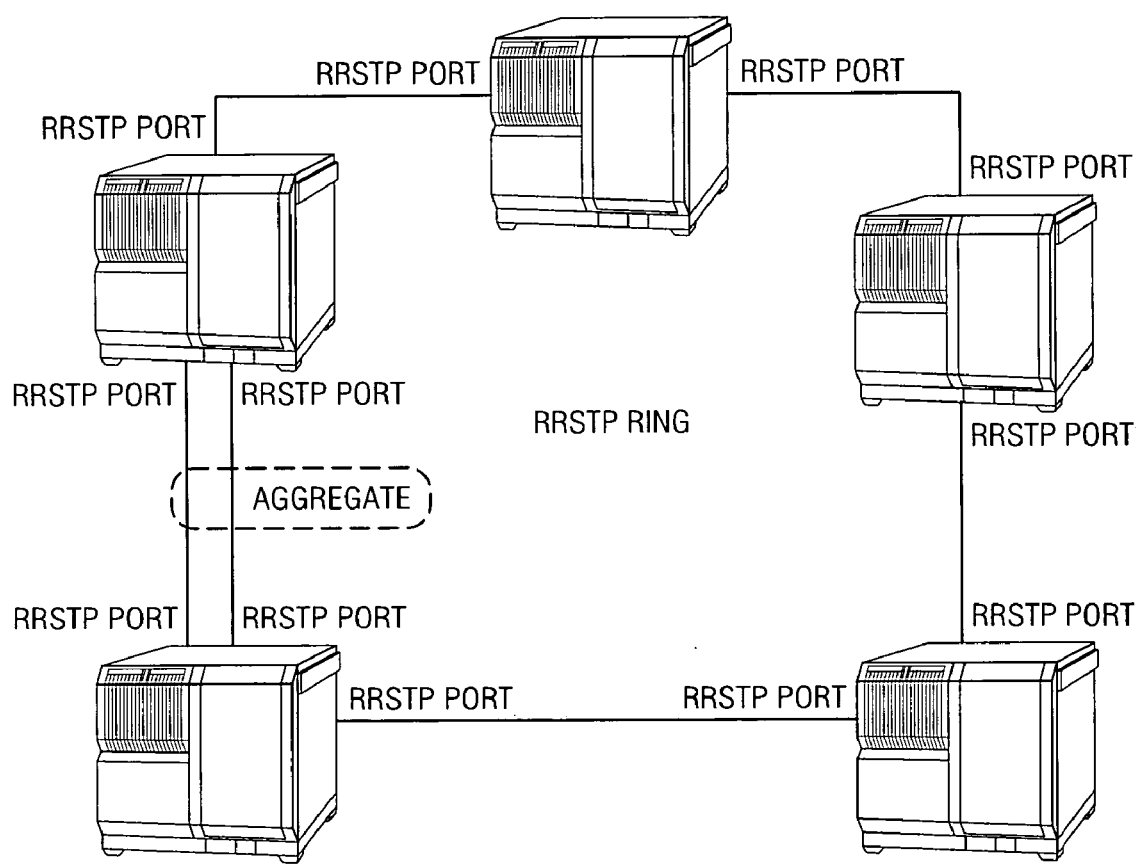
FIG. 7 depicts a first alternate embodiment of a RRSTP-supporting node topology.
Figure 8:
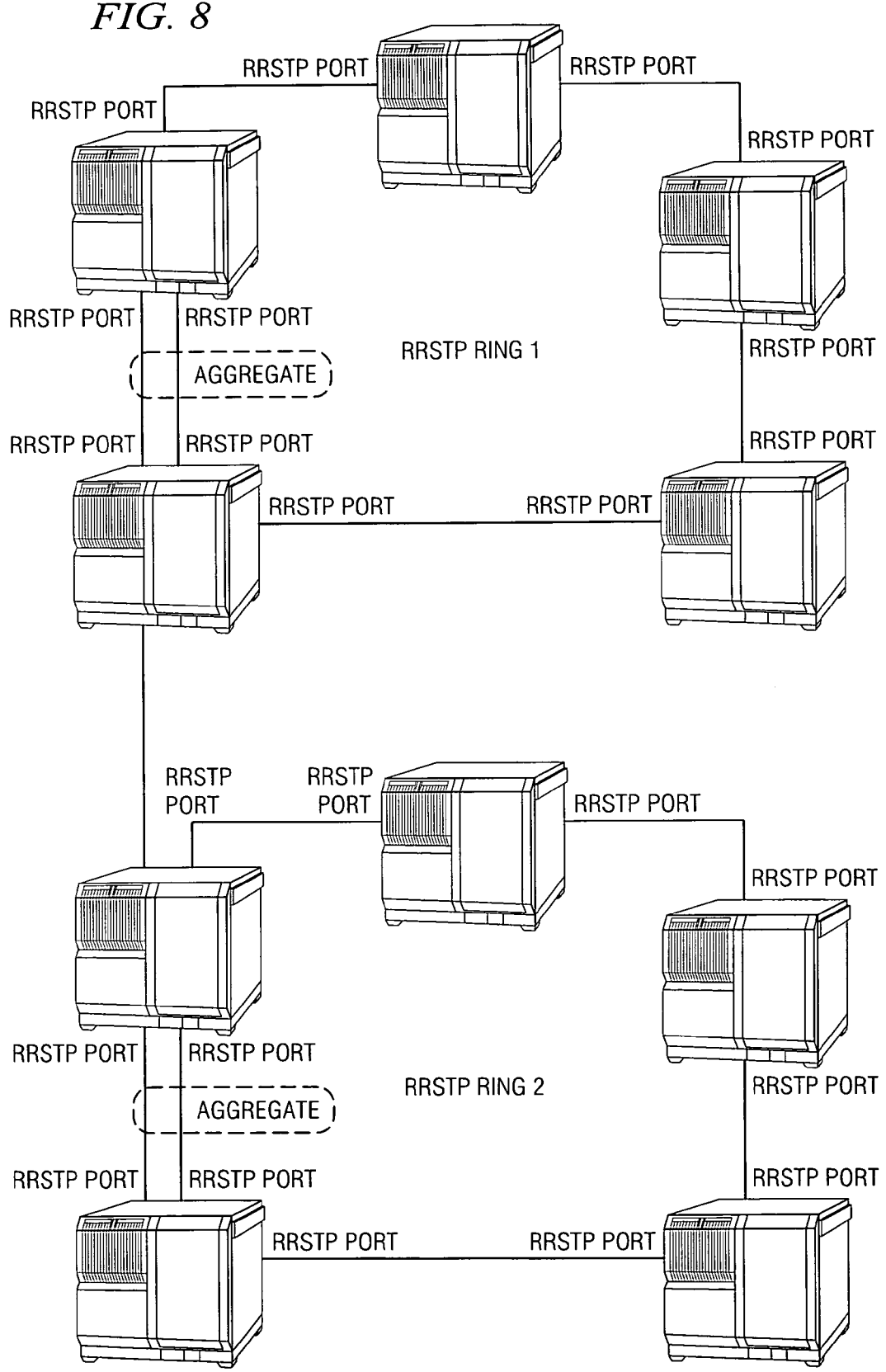
FIG. 8 depicts a second alternate embodiment of a RRSTP-supporting node topology.

With respect to node topology requirements, it must also be understood that once a port is declared as an RRSTP port for a RRSTP ring, it cannot be used for anther RRSTP ring. Additionally, because the standard is modified to allow very rapid re-convergence proposal/agreement sequence, allowed topologies are constrained. For example, node topologies where one link that is not part of the same RRSTP ring as a particular RRSTP ring (i.e., a port is either part of another RRSTP ring or is a STP/RSTP/MSTP port) would be in place between 2 RRSTP bridges already connected through RRSTP ports do not support RRSTP functionality in accordance with the present invention. Examples of alternate node topologies that have two point-to-point links as part of the same RRSTP port and, thus, do support RRSTP functionality in accordance with the present invention are disclosed in FIGS. 7 and 8.

Referring now to computer readable medium (e.g., software), it will be understood from the disclosures made herein that methods, processes and/or operations adapted for carrying out RRSTP functionality as disclosed herein are tangibly embodied by computer readable medium having instructions thereon for carrying out such functionality. In one specific embodiment, the instructions are tangibly embodied for carrying out at least a portion of the functionality disclosed above in reference to FIGS. 1-6. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., a set of instructions) adapted for carrying out RRSTP functionality in accordance with the present invention made herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical, mechanical and electrical changes may be made without departing from the spirit or scope of the invention. For example, functional blocks shown in the figures could be further combined or divided in any manner without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
receiving designation information for a first port of each one of a plurality of bridges in a multi-bridge ring, wherein the first port of each one of a plurality of bridges is a first direction Ring Rapid Spanning Tree Protocol (RRSTP) port;
receiving designation information for a second port of each one of a plurality of bridges in a multi-bridge ring, wherein the second port of each one of a plurality of bridges is a second direction RRSTP port and wherein the first direction around said ring is opposite the second direction around said ring;
associating a first reserved MAC address with the first direction port of each one of said bridges; and
associating a second reserved MAC address with the second direction port of each one of said bridges and the following is inserted on a new line immediately afterwards, configuring associated hardware of each one of said bridges to forward information transmission units using one of said reserved MAC addresses to a CPU of a respective one of said bridges.

2. The method of claim 1, further comprising:
supporting a conventional Spanning Tree Protocol on said RRSTP ports of each one of said bridges simultaneously with supporting said RRSTP on said RRSTP ports.

3. The method of claim 1 wherein associating said MAC addresses includes configuring a forwarding table utilized by each one of said bridges such that the first direction RRSTP port of each one of said bridges receives traffic associated with the first reserved MAC address and the second direction RRSTP port of each one of said bridges receives traffic associated with the second reserved MAC address.

4. The method of claim 1 wherein said associating the first reserved MAC address and said associating the second reserved MAC address is performed, respectively, after receiving designation information for the first direction RRSTP port and receiving designation information for the second direction RRSTP port.

5. The method of claim 1, further comprising:
sending a RRSTP Bridge Protocol Data Unit (BPDU) using the first reserved MAC address in the first direction toward a second one of said bridges in response to detecting a link failure at a first one of said bridges.

6. The method of claim 5, further comprising:
triggering at least one state of a port information state machine of the second one of said bridges in response to receiving a RRSTP BPDU by the second one of said bridges and the second one of said bridges having a port designated as Alternate, wherein said triggering initiates a port of the second one of said bridges designated as Root Forwarding becoming designated as Designated Forwarding and wherein a port of the second one of said bridges designated as Alternate becoming designated as Root Forwarding.

7. The method of claim 6, further comprising:
triggering at least one state of the port information state machine of the second one of said bridges in response to the port of the second one of said bridges designated as Alternate becoming designated as Root Forwarding, wherein said triggering initiates sending of a RRSTP TC BPDU on both of said RRSTP ports of the second one of said bridges toward a third one of said bridges and flushing the L2 forwarding table on the first one of said bridges.

8. The method of claim 6, further comprising:
triggering at least one state of the port information state machine of the third one of said bridges in response to the third one of said bridges receiving the RRSTP TC BPDU, wherein said triggering initiates flushing the L2 forwarding table on the first one of said bridges and sending of the RRSTP TC BPDU in the first direction using the first reserved MAC address from the second one of said bridges toward a fourth one of said bridges.

9. The method of claim 1, further comprising:
configuring associated hardware of each one of said bridges to forward information transmission units using one of said reserved MAC addresses to a CPU of a respective one of said bridges; and
supporting a conventional Spanning Tree Protocol on said RRSTP ports of each one of said bridges simultaneously with supporting said RRSTP on said RRSTP ports;
wherein said associating includes configuring a forwarding table utilized by each one of said bridges such that the first direction RRSTP port of each one of said bridges receives traffic associated with the first reserved MAC address and the second direction RRSTP port of each one of said bridges receives traffic associated with the second reserved MAC address; and
said associating the first reserved MAC address and said associating the second reserved MAC address is performed, respectively, after receiving designation information for the first direction RRSTP port and receiving designation information for the second direct on RRSTP port.

10. The method of claim 9, further comprising:
sending a RRSTP BPDU using the first reserved MAC address in the first direction toward a second one of said bridges in response to detecting a link failure at a first one of said bridges;
triggering at least one state of a port information state machine of the second one of said bridges in response to receiving a RRSTP BPDU by the second one of said bridges and the second one of said bridges having a port designated as Alternate, wherein said triggering initiates a port of the second one of said bridges designated as Root Forwarding becoming designated as Designated Forwarding and wherein a port of the second one of said bridges designated as Alternate becoming designated as Root Forwarding;

triggering at least one state of the port information state machine of the second one of said bridges in response to the port of the second one of said bridges designated as Alternate becoming designated as Root Forwarding, wherein said triggering initiates sending of a RRSTP TC BPDU on both of said RRSTP ports of the second one of said bridges toward a third one of said bridges and flushing the L2 forwarding table on the first one of said bridges; and triggering at least one state of the port information state machine of the third one of said bridges in response to the third one of said bridges receiving the RRSTP TC BPDU, wherein said triggering initiates flushing the L2 forwarding table on the first one of said bridges and sending of the RRSTP TC BPDU in the first direction using the first reserved MAC address from the second one of said bridges toward a fourth one of said bridges.

11. A method, comprising:

configuring two ports of each one of a plurality bridges in a multi-bridge ring for bi-directional transmission of information transmission units, wherein a first one of said ports of each one of said bridges is a first direction port that transmits information transmission units in a first direction around said ring and wherein a second one of said ports of each one of said bridges is a second direction port that transmits information transmission units in a second direction opposite the first direction around said ring; and configuring a forwarding table utilized by each one of said bridges such that the first one of said ports of each one of said bridges receives traffic associated with the first reserved MAC address and the second one of said ports of each one of said bridges receives traffic associated with the second reserved MAC address.

12. The method of claim 11, further comprising:

configuring associated hardware of each one of said bridges to forward information transmission units using one of said reserved MAC addresses to a CPU of a respective one of said bridges.

13. The method of claim 12 wherein said configuring two ports of each one of the plurality bridges includes:

receiving designation information for the first on of said ports of each one of said bridges, wherein the first port of each one of said bridges is a first direction Ring Rapid Spanning Tree Protocol (RRSTP) port;

receiving designation information for the second one of said ports of each one of said bridges and wherein the second port of each one of said bridges is a second direction RRSTP port;

associating a first reserved MAC address with the first direction RRSTP port of each one of said bridges; and associating a second reserved MAC address with the second direction RRSTP port of each one of said bridges.

14. The method of claim 13 wherein said associating the first reserved MAC address and said associating the second reserved MAC address is performed, respectively, after said receiving designation information for the first direction RRSTP port and said receiving designation information for the second direction RRSTP port.

15. A computer readable medium tangibly embodying a set of instructions interpretable by a data processing system, said set of instructions comprising:

instructions for configuring two ports of a respective bridge on which said RRSTP software resides for bi-directional transmission of information transmission units, wherein a first one of said ports is a first direction RRSTP port that transmits information transmission units in a first direction around said ring, wherein a second one of said ports is a second direction RRSTP port that transmits information transmission units in a second direction around said ring and wherein the first direction around a ring of bridges is opposite the second direction; and instructions for configuring a forwarding table utilized by the respective bridge such that the first direction RRSTP port receives traffic associated with the first reserved MAC address and the second direction RRSTP port receives traffic associated with the second reserved MAC address.

16. The computer readable medium of claim 15, further comprising:

instructions for configuring associated hardware of the respective bridge to forward information transmission units using one of said reserved MAC addresses to a CPU of the respective bridge.

17. The computer readable medium of claim 16 wherein said instructions for configuring two ports of the respective bridge includes:

instructions for receiving designation information for the first direction RRSTP port of the respective bridge;

instructions for receiving designation information for the second direction RRSTP port of the respective bridge;

instructions for associating a first reserved MAC address with the first direction RRSTP port of the respective bridge; and instructions for associating a second reserved MAC address with the second direction RRSTP port of the respective bridge.

18. The computer readable medium of claim 17, further comprising:

instructions for changing a port designated as Root Forwarding to a port designated as Designated Forwarding and changing a port designated as Alternate to a port designated as Root Forwarding;

instructions for receiving a RRSTP Bridge Protocol Data Unit (BPDU);

instructions for facilitating determination of a port designated as Alternate; and instructions for facilitating determination of whether a Topology Change (TC) flag of the respective bridge is set.

19. The computer readable medium of claim 18, further comprising:

instructions for sending a RRSTP TC BPDU on at least one of said RRSTP ports toward an adjacent bridge and flushing the L2 forwarding table of the respective bridge.

* * * * *